FIG. 1

JAMES J. DUFFY
INVENTOR

JAMES J. DUFFY
INVENTOR

Sept. 13, 1966  J. J. DUFFY  3,272,029
AUTOMATIC POWER TRANSMISSION SYSTEM
Filed April 12, 1963  6 Sheets-Sheet 5

JAMES J. DUFFY
INVENTOR:

BY
ATTORNEYS

United States Patent Office 3,272,029
Patented Sept. 13, 1966

3,272,029
AUTOMATIC POWER TRANSMISSION SYSTEM
James J. Duffy, Livonia, Mich., assignor to Ford Motor Company, Dearborn, Mich., a corporation of Delaware
Filed Apr. 12, 1963, Ser. No. 272,746
8 Claims. (Cl. 74—472)

My invention relates generally to multiple speed power transmission mechanisms for engine powered vehicles, and more particularly to a new and improved control system for regulating automatic shifts from one operating speed ratio to another in accordance with the operating requirements.

This disclosure is a continuation-in-part of my copending application S.N. 6,703, now Patent No. 3,095,755 filed February 4, 1960.

I am aware of several automatic type power transmission mechanisms having plural torque delivery paths defined by gear elements wherein the relative motion of the gear elements is controlled by fluid pressure operated clutch or brake servos. The control system for such a mechanism is defined in part by a clutch or brake servo, and it also includes a fluid pressure pump driven by the vehicle engine or by the transmission power output shaft, said pump acting as a source of control pressure. The circuitry interconnecting the pressure source and the servos includes shift valve elements which selectively distribute control pressure to the servos to establish appropriate transmission speed ratios during a shift sequence. The shift valve elements are actuated in response to opposed fluid pressure signals which in turn are related functionally to engine torque demand and vehicle speed.

The engine torque demand signal is established by means of a transmission throttle valve, and it is conventional practice to provide a mechanical linkage connection between the transmission throttle valve and the engine carburetor throttle valve so that the pressure signal produced by the transmission throttle valve will be determined by the degree of carburetor throttle valve opening. The transmission shift pattern therefore is determined by the functional relationship between vehicle speed and the vehicle speed signal and by the functional relationship between carburetor throttle valve opening and transmission throttle valve pressure.

In view of the foregoing, the carburetor valve opening which is necessary to initiate any one of the transmission ratio shifts must be greater at higher vehicle speeds than at lower vehicle speeds. During movement of the carburetor valve from a fully closed position to about one half of the wide open position, the engine torque will vary in an approximately proportional relationship with carburetor valve opening. During movement of the carburetor valve at more advanced settings, the engine torque will change only slightly and the engine carburetor valve setting will not be an accurate indicator of engine torque. Notwithstanding this, the transmission throttle valve pressure will continue to increase as the engine carburetor valve setting is increased beyond a medium range of settings until an ultimate throttle pressure corresponding to a wide open carburetor valve setting is reached.

It is customary in certain automatic transmission control circuits of known construction to make provision for obtaining a downshift for acceleration purposes, and the valve elements are calibrated so that the downshift occurs whenever the transmission throttle valve pressure increases sufficiently to overcome the opposing force of the vehicle speed pressure signal acting on the shift valves. The speed at which a shift occurs from one ratio to another for any given carburetor throttle valve opening is referred to commonly as the shift point. When a downshift is made at the wide open throttle setting of the carburetor, the vehicle operator must move the carburetor linkage to a detent position which may be sensed by the vehicle operator. Such a wide open throttle downshift commonly is called a forced downshift. For purposes of the present discussion, an upshift that occurs with the engine throttle at or near the wide open detent position will be referred to as a "to detent" upshift.

In my improved control system I have developed an improved transmission throttle pressure control valve and a valve actuator that eliminate the above-described direct mechanical linkage. This improved system utilizes an engine manifold pressure operated servo which controls the transmission throttle valve, and engine intake manifold pressure rather than carburetor throttle valve movement functions as the transmission throttle valve actuating agent.

The provision of an improved control system as above set forth being a principal object of my invention, it is a further object of my invention to eliminate the mechanical linkage between the engine carburetor and the transmission, and to replace the same by a vacuum pressure line extending between the engine intake manifold and a manifold pressure operated servo, the latter being mechanically connected to the transmission throttle valve.

It is a further object of my invention to provide an automatic power transmission control system that may be calibrated readily to obtain the desired transmission shift points and which simplifies the transmission installation.

It was previously explained that engine torque varies only slightly with carburetor throttle valve movement at more advanced settings. It therefore follows that the intake manifold pressure also varies only slightly under these driving conditions. In my improved system, throttle valve pressure is a function of absolute engine intake manifold pressure, and provision must therefore be made to modify the relationship between engine manifold pressure and transmission throttle valve pressure when the carburetor throttle valve assumes an advanced setting. Unless an appropriate modification is made, the "to detent" upshift will occur at a speed much lower than the desired speed or shift point. Further, if a system lacking such a modification were calibrated so that the "to detent" upshift occurs at the desired speed, the shift points at the carburetor throttle settings less than the wide open setting would be late; e.g., the shift points would occur at vehicle speeds considerably greater than the desired speed.

It is therefore another object of my invention to provide a transmission control system of the type above described which includes valve means for amplifying the engine torque output signal during movement of the carburetor throttle valve at advanced settings so that the advanced throttle shift points will be established properly.

It is a further object of my invention to provide a system of the type above set forth wherein the engine torque output signal is substantially proportional to carburetor throttle valve movement during movement of the carburetor throttle valve in a reduced range of settings.

When a vehicle having a conventional control system is operated at higher altitudes, a loss of engine torque at the shift points is experienced. The engine must be operated at more advanced carburetor throttle settings at any given speed when the ambient pressure decreases under high altitude driving conditions, and the transmission throttle pressure is increased accordingly in comparison to the throttle pressure that exists during operation under the same speed and road conditions at lower altitude. In a conventional control system having a mechanical connection between the carburetor and the transmission, this variation in transmission throttle pressure adversely affects the quality of the shift pattern, and this is due in part to the relationship between the control pressure and transmission throttle pressure.

The control pressure is maintained at a desired operating level for any given speed and torque condition by means of a pressure regulator valve that is sensitive to changes in transmission throttle pressure. The regulator valve is designed to regulate control pressure at a value which will cause the transmission control clutch or brake servos to function with a desired capacity. It therefore follows that if the transmission throttle pressure increases with altitude for any given control pressure, the control pressure will also increase so that the operating control pressure level may be too high to effect a smooth shift from one ratio to another. During acceleration at any given throttle setting, such loss in torque will give the vehicle operator the same sensation that a "late" upshift would give, although the "to detent" upshift point is unaltered.

It is therefore another object of my invention to provide a control system which will avoid substantially the foregoing shortcomings of conventional control systems.

It is another object of my invention to provide a control system of the type above set forth wherein the upshift points for all throttle settings are calibrated for optimum quality throughout a wide range of barometric pressures. If the vehicle operator advances the engine throttle through the detent point, line pressure is distributed to the shift valves and this then establishes a delay in the upshift to the high speed ratio that is determined by the magnitude of that pressure. This requires a separate calibration. The improvements of this invention are designed primarily to improve the quality of the shifts that are made with the engine throttle at a setting that is less than the "through detent" setting.

At higher altitudes a loss of engine torque tends to occur at the shift points due to a loss of engine absolute manifold pressure at any given carburetor opening. It is an object of my instant invention, therefore, to compensate for this loss of engine torque at the shift points so that each shift will occur at a desired engine torque for any given carburetor opening regardless of changing barometric pressure.

In my co-pending application S.N. 6,703 I have disclosed a manifold pressure operated throttle valve control. With this type of control there is a slight loss of manifold vacuum and a gain of throttle pressure during part throttle operation as the altitude or barometric pressure changes. It is an object of my instant invention, therefore, to compensate for this loss of vacuum and gain of throttle pressure for part throttle settings.

For the purpose of more particularly describing the principal features of my invention, reference will be made to the accompanying drawings, wherein:

FIGURE 3 is an enlarged cross sectional view of the transmission throttle valve for the control circuit of FIGURES 2a and 2b together with a cross sectional view of an engine manifold pressure operated servo for actuating the transmission throttle valve;

FIGURE 4 is a schematic illustration of the connection between the operator controlled accelerator pedal and a kickdown valve element of the control circuit of FIGURES 2a and 2b;

FIGURE 5a is a schematic view showing a throttle pressure booster valve mechanism of the control circuit of FIGURES 2a and 2b;

FIGURE 5b is a modification of the throttle pressure booster valve of FIGURE 5a;

Figure 1:
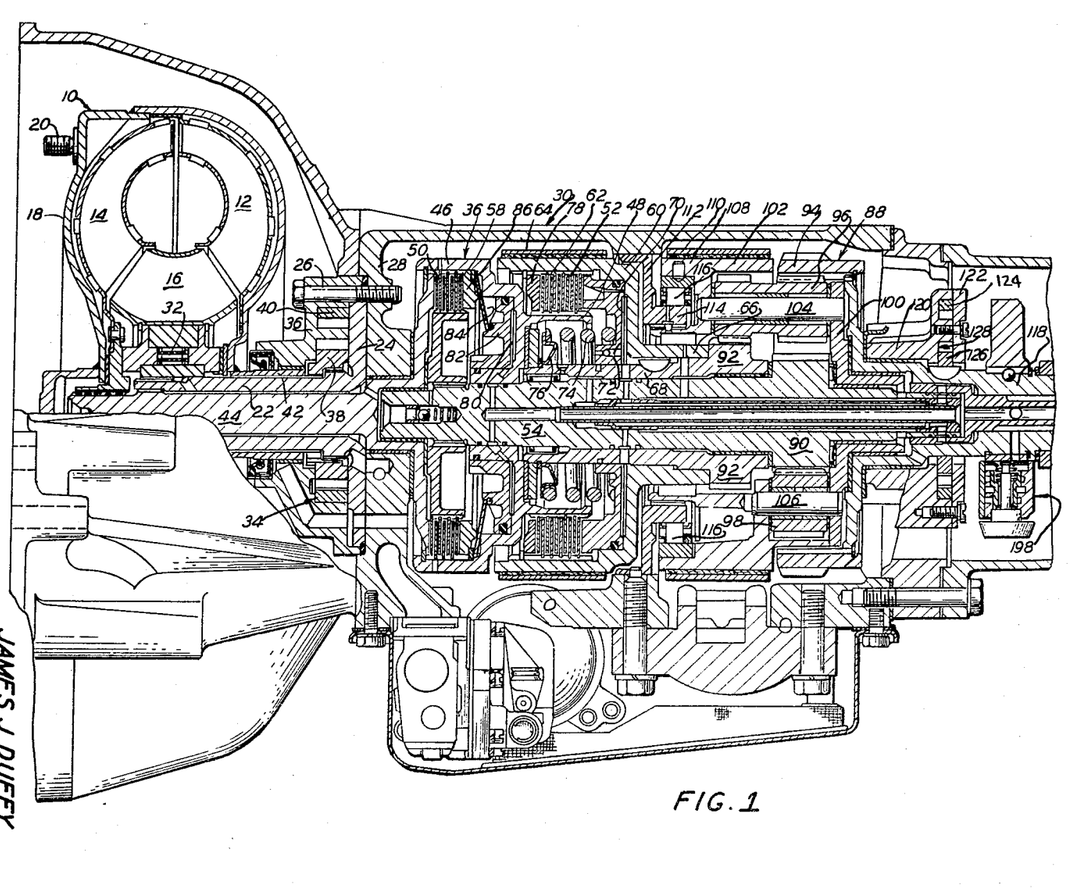
FIGURE 1 is a cross sectional view of a multiple speed automatic power transmission mechanism capable of being used with my improved control circuit.

Referring first to FIGURE 1, I will describe very briefly the structural arrangement of the gear elements of the transmission therein shown, together with its mode of operation. This description will be limited in detail and it is merely designed to permit an understanding of the manner in which the various speed ratio changes are accomplished.

Numeral 10 generally designates a pump housing for a hydrokinetic torque converter comprising a pump member 12, a turbine member 14 and a reactor member 16. The converter members 12, 14 and 16 are situated in toroidal fluid flow relationship and they define a toroidal fluid circuit capable of establishing hydrokinetic action. The pump housing 10 includes a pump housing cover 18 which may be drivably connected to a flexible flywheel or drive plate by suitable bolts 20. This flywheel, which is not illustrated in FIGURE 1, is drivably connected to the vehicle engine crankshaft in a conventional manner.

The reactor 16 is mounted upon a stationary sleeve shaft 22 which is formed with a radial flange portion 24. Bolts 26 are used for the purpose of bolting flange portion 24 to a wall 28 in the transmission housing, the latter being generally identified by reference character 30. A one-way over-running clutch 32 is used for anchoring reactor member 16 to sleeve shaft 22 thereby preventing reverse rotation of reactor member 16 and accommodating forward free wheeling of the same.

A control pressure pump is shown at 34 and it includes a pump housing member 36 bolted to wall portion 28 of housing 30. It cooperates with flange portion 24 to define a pump cavity within which pump gear elements 38 and 40 are situated. Gear element 38 is connected drivably to the hub 42 of the converter pump member 12.

Turbine member 14 is connected drivably to power delivery shaft 44 which in turn is connected drivably to clutch member 36. The wall portion 28 forms a bearing support for journaling shaft 44 as indicated.

Clutch member 36 is formed with an internally splined portion 46 and an externally splined portion 48 which respectively carry externally and internally splined clutch plates 50 and 52. An intermediate power delivery shaft is shown at 54 and it is journaled at one end thereof within a bearing opening formed in shaft 44. A clutch member 56 is connected to shaft 54 and is externally splined to accommodate externally splined clutch plates 58, said plates 58 cooperating with clutch plates 50 to define a multiple disc clutch assembly hereinafter referred to as the front clutch. A drum member is shown at 60 and it includes internal splines which carry mating externally splined clutch plates 62 that cooperate with the aforementioned clutch plates 52 to define a multiple disc clutch assembly hereinafter referred to as the rear clutch. A friction brake band 64 encircles drum portion 60, and it is adapted to engage frictionally and anchor the same when it is energized by means of a fluid pressure operated servo hereinafter described with reference to the schematic drawings of FIGURES 2a and 2b.

The drum member 60 includes a hub portion 66 that is keyed to a sun gear shaft 68, and it cooperates with shaft 68 to define an annular cylinder 70 within which is disposed a cooperating annular piston 72. Piston 72 is urged in a righthand direction as viewed in FIGURE 1 by a servo spring 74 that is anchored by means of a spring seat 76 carried by sun gear shaft 54. Fluid pressure may be admitted into working chamber 70 to energize the rear clutch and to form a driving connection between drum member 60 and clutch member 46. A clutch plate backup member 78 is carried by drum member 60 to accommodate the piston force reaction.

Clutch member 36 is journaled on shaft 54 and it defines an annular cylinder 80 within which is positioned a cooperating annular piston 82. A spring disc 84 is used for transmitting the hydraulic pressure force acting on piston 82 to a clutch actuator ring 86 thereby energizing the front clutch and establishing a driving connection between clutch member 36 and clutch member 56.

The planetary gear portion of the transmission mechanism is identified generally by reference character 88 and it includes a first sun gear 90 formed integrally with shaft 54 and a second sun gear 92 formed integrally with sun gear shaft 68. A ring gear is shown at 94 and compound or long planet pinions are shown at 96. Pinions 96 include a first gear portion drivably engageable with ring gear 94 and a second gear portion drivably engageable with sun gear 92. Planet pinions 96 also drivably engage short planet pinions 98 which in turn mesh with sun gear 90. By preference, three pinions 98 and three pinions 96 are provided in alternating, spaced relationship. Pinions 96 and 98 are carried by a common carrier that includes carrier portion 100 and carrier portion 102, said carrier portions being interconnected by pinion shafts 104 on which pinions 96 are journaled. In a similar fashion pinions 98 are journaled on pinion shafts 106.

Carrier portion 102 defines a brake drum 108 about which is disposed a friction brake member 110 adapted to anchor the planetary carrier when it is energized by a suitable servo mechanism subsequently to be described.

An anchor member 112 is secured to housing 30 and it includes a radially inward portion 114 that serves as the inner race for an overrunning brake 116. The outer race for brake 116 is carried by the carrier drum portion 108. The overrunning brake 116 is adapted to prevent rotation of the planetary carrier in one direction, but it will permit rotation thereof in the opposite direction. During forward driving operation, the positive torque reaction of the carrier is adsorbed by reason of the anchoring action of overrunning brake 116.

Ring gear member 94 is drivably connected to a power output member shown at 118 which in turn is journaled within a rear pump housing 120. The hub of carrier portion 100 is journaled within the power output member 118 and the rearward end of shaft 54 is in turn journaled within the hub of carrier portion 100 as indicated.

The housing 120 is joined to the housing 30 and it cooperates with a pump cover plate 122 to define a rear pump chamber within which pump gear elements 124 and 126 are situated. Pump gear element 126 is keyed to power output member 118. The pump which is comprised of gear elements 124 and 126 is identified generally by reference character 128 and it will hereinafter be referred to as the rear pump. Both the pumps 34 and 128 form a portion of the control circuit of FIGURES 2a and 2b.

The transmission mechanism of FIGURE 1 is capable of establishing three forward drive ratios and one reverse drive ratio. The lowest transmission speed ratio is established by energizing the clutch 50 which forms a part of a driving connection between turbine member 14 and sun gear 90. Pinion 98 is connected drivably to sun gear 90 and pinion 104, and the carrier forms the torque reaction member by reason of the operation of the overrunning brake 116. The ring gear 94 will be driven in the same direction as the direction of rotation of sun gear 90, and the speed ratio between sun gear 90 and ring gear member 94 will be a maximum. Ring gear 94, is, of course, connected to the power output member 118 as previously indicated.

To establish second gear operation, brake 64 is energized and this in turn anchors sun gear 92. The turbine torque is delivered to sun gear 90 in this instance and since sun gear 92 is anchored, pinions 96 will tend to ride around the axis of sun gear 92 instead of remaining stationary as in the case of low speed operation. The over-all speed ratio between sun gear 90 and ring gear 94 is therefore corresponding increased.

To establish third gear or high speed ratio operation, brake band 64 is de-energized and the rear clutch is engaged. Since both the front and rear clutches are now simultaneously operating, the sun gears 92 and 90 will be locked together and this in turn causes the entire planetary gear unit to become locked for joint rotation. The over-all driving ratio between the turbine member 14 and power output member 118 is therefore 1:1.

During operation in the second gear ratio above described, the overrunning brake mechanism 116 accommodates rotation of the planetary carrier member in a forward direction about the axis of anchored sun gear 92, the latter serving as a torque reaction member in this instance. However, provision may be made for conditioning the transmission for continued low speed operation by continuously energizing brake band 110 while the rear clutch and front band are disengaged. This operation is referred to as the low gear driving range.

Reverse drive may be accomplished by de-energizing the front clutch and energizing the rear clutch while simultaneously energizing the rear band. It is thus apparent that the turbine torque will be delivered through the rear clutch to sun gear 92. Sun gear 90 free wheels during reverse drive since the front clutch is disengaged. Since the carrier is anchored by brake band 110, it serves as a reaction member and the ring gear 94 and power output member 118 are therefore driven in a reverse direction relative to the direction of rotation of sun gear 92.

*Description of control circuit*

Figure 2A:
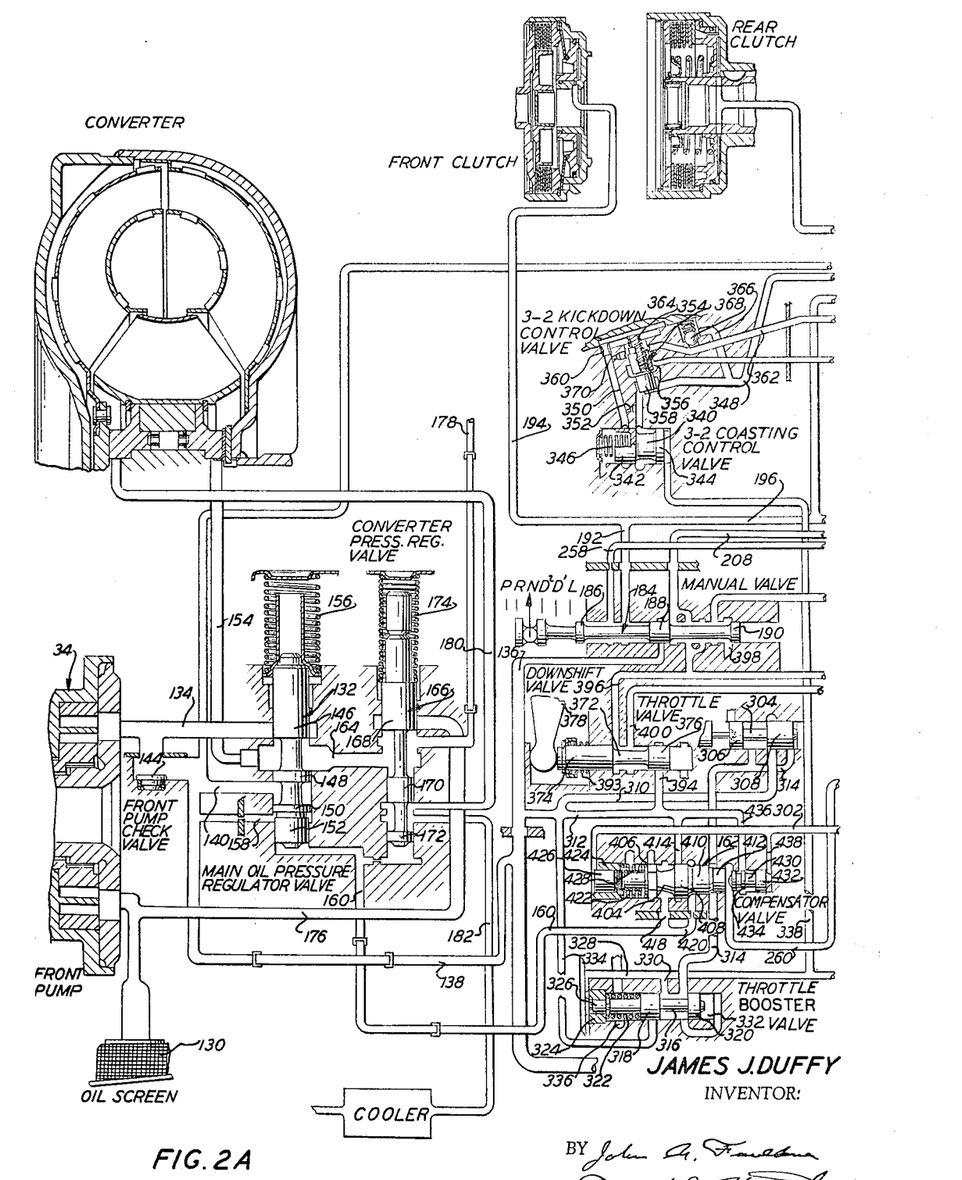
FIGURES 2a and 2b are schematic illustrations of my improved transmissions control circuit.
Figure 2B:
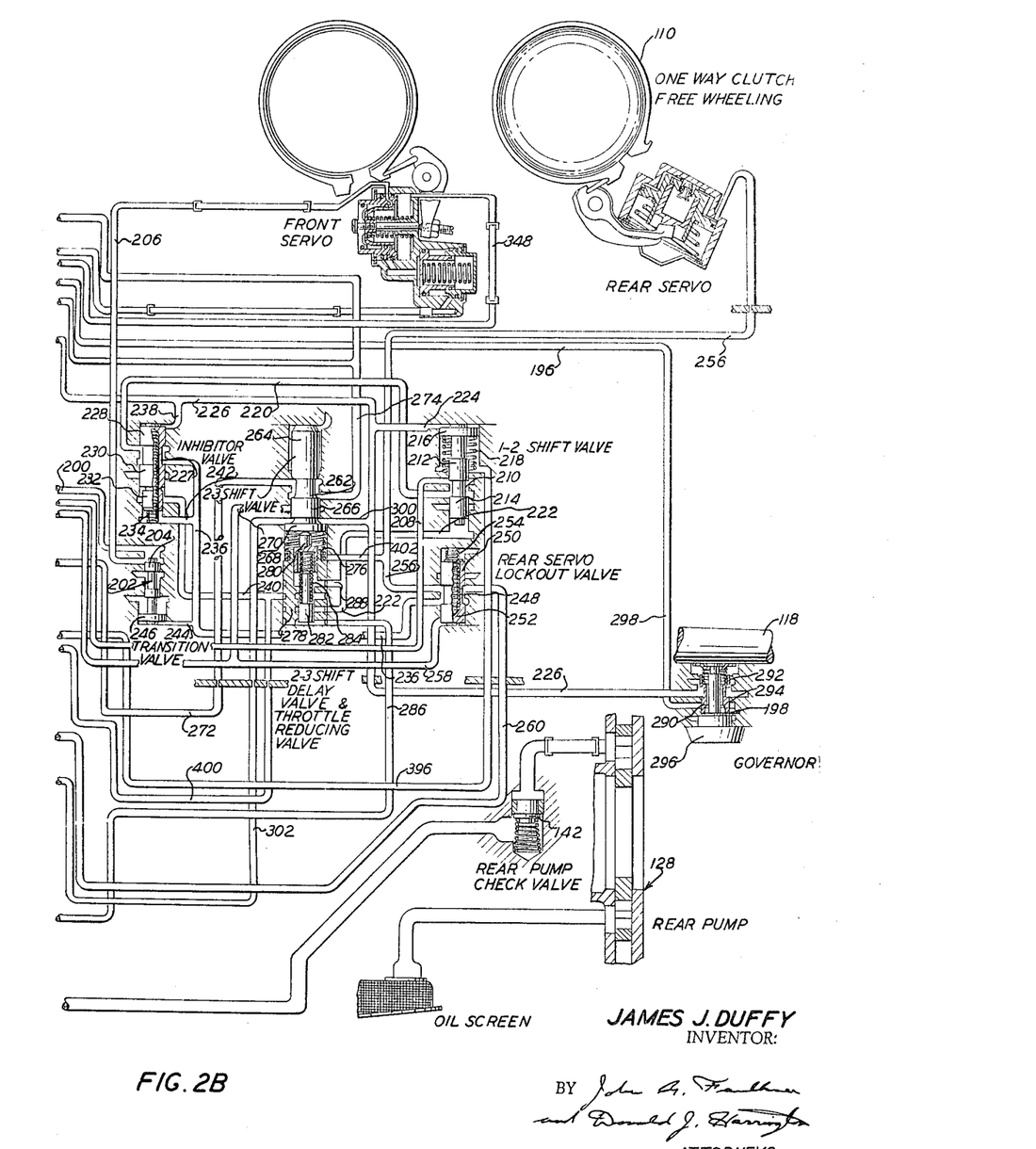

Referring next to FIGURES 2a and 2b, the front and rear clutches and the front and rear brakes are identified by appropriate legends. The front pump 34 and the rear pump 128 are supplied with low pressure fluid from a common oil sump identified by reference character 130. The discharge side of front pump 34 communicates with a pressure regulator valve 132 through a control pressure passage 134. The discharge side of the tail shaft driven rear pump 128 communicates with regulator valve 132 through control pressure passages 136 and 138 and through branch passage 140. A one-way check valve 142 is situated in passage 136, as indicated, to accommodate a transfer of fluid from pump 138 to regulator valve 132 while inhibiting a reverse flow. In a similar fashion a one-way check valve 144 is disposed on the discharge side of pump 34 between passages 134 and 140. If it is assumed that the discharge pressure from pump 34 is greater than the discharge pressure for the tail shaft driven rear pump 128, check valves 142 and 144 will respectively assume a closed position and an open position as indicated in FIGURES 2a and 2b. This condition normally exists during forward driving operation in the first or second transmission speed ratio. The control pressure requirements of the circuit are, therefore, supplied by the pump 34.

Regulator valve 132 comprises a valve spool having spaced valve lands 146, 148, 150 and 152 which cooperate with internal valve lands formed in the valve cavity within which the valve spool is situated. Control pressure passage 134 communicates with a converter pressure supply passage 154 through a regulator valve chamber and the degree of communication between these passages is regulated by valve land 146. The regulator valve spool is biased in a downward direction, as seen in FIGURE 2a, by a regulator valve spring 156, and the spring biasing force is opposed by a hydraulic pressure force acting on a differential area defined by adjacent valve lands 150 and 152. Low pressure is supplied to this low pressure area by a branch passage 158. It is apparent that the regulator valve will function to regulate the magnitude of the pressure level existing in passages 134, 140, 138 and 136.

The force of spring 156 is opposed also by a compensator pressure force acting on the lower end of the regulator valve spool, and this compensator pressure is supplied to the lower end of the regulator valve chamber through a compensator pressure passage 160 that in turn extends to a compensator valve generally identified by reference character 162. This compensator valve subsequently will be described briefly.

Passage 154 communicates with passage 164 through the valve chamber and this passage is defined in part by spaced valve lands 146 and 148. Passage 164 extends to a converter pressure regulator valve past a movable valve spool 166 having spaced valve lands 168, 170 and 172. Passage 164 communicates with the valve chamber occupied by the converter pressure regulator valve spool between valve lands 168 and 170 as indicated. The diameter of valve land 168 is greater than the diameter of valve land 170, and a valve biasing force due to the pressure in passage 164 therefore acts on the converter pressure regulator valve spool to urge the same in an upward direction as shown in FIGURE 2a. This pressure force is opposed and balanced by a converter pressure regulator valve spring 174. A low pressure sump passage 176 communicates with the valve chamber of the converter regulator valve spool and the valve land 168 controls the pressure distribution between passages 178 and 176, the latter extending to the sump 130. It is apparent from the foregoing that the converter pressure regulator valve will control the magnitude of the pressure level existing in passages 154 and 164 at a calibrated operating level. This same valve functions to control the magnitude of the lubricating oil pressure which is supplied to lubricating oil passage 178, the latter communicating with passage 164 through the space defined by valve lands 168 and 170.

The converter pressure regulator valve is subjected also to a compensator pressure force and compensator pressure is supplied to the lower end of the converter pressure regulator valve chamber for this purpose. The compensator pressure forces acting on the control pressure regulator valve and the converter pressure regulator valve influence the regulated pressure of each, and the magnitude of the compensator pressure can be controlled in a manner subsequently to be described in order to produce the desired regulating characteristics for each of these regulator valves.

The low pressure side of the torque converter circuit is connected to a converter fluid return passage 180 which communicates with the converter pressure regulator valve chamber at a location adjacent valve land 170. Similarly, an exhaust passage 182 communicates with the converter pressure regulator valve chamber at a location intermediate valve lands 170 and 172, and when the converter pressure regulator valve spool 166 assumes a downward position, the valve land 170 blocks passage 178.

When the vehicle engine first begins to operate, after the initial firing, the pump 34 will immediately begin to operate. Prior to this time, both of the regulator valves assumed downward positions and the initial pressure produced by the pump 34 causes the control pressure regulator valve spool to move in an upward direction until it begins to regulate at the desired operating level. At this instant converter fluid is made available to the converter and when the pressure requirements of the converter are satisfied, the converter pressure regulator valve will then begin to function. When the converter pressure reaches the desired level, the lubricating oil passage 178 is uncovered by valve land 168 and the lubricating oil pressure requirements of the transmission are therefore satisfied. Upon a further increase in the magnitude of the converter pressure, valve land 170 will uncover the converter fluid in passage 180, thereby completing the fluid circuit through the torque converter. An oil cooler is provided, as indicated, in exhaust passage 182 for the purpose of dissipating the energy absorbed by the hydrokinetic fluid.

If the driving conditions are such that the discharge pressure of pump 128 is greater than the discharge pressure for pump 34, check valve 144 will close and check valve 142 will open. Control pressure, therefore, will be supplied to passages 136, 138 and 140 by the rear pump 128. In this instance the degree of communication between passages 140 and 164 is controlled by the valve land 148, and the regulator valve spool 132 will assume a new balanced position in order to permit this regulation to take place. When this new balanced position has been assumed, passages 134 and 164 communicate freely since valve land 146 is no longer capable of functioning to regulate pressure. The pressure head for the pump 34 thereby is reduced and the horsepower loss caused by the pump 34 thus is reduced to a minimum. A manual valve is shown in FIGURE 2a and it comprises a valve spool generally designated by reference character 184. This valve spool may be moved within its cooperating valve chamber by means of a driver controlled gear shift lever or some other suitable transmission range selector mechanism. During operation of the vehicle the manual valve may be moved to any one of six positions which are separately identified in FIGURE 2a by letters P, R, N, $D^2$, $D^1$ and L which respectively correspond to park, reverse, neutral, secondary drive range, primary drive range and low drive range. The position of the manual valve selected by the vehicle operator determines the operating drive range for the transmission.

The valve spool 184 includes three valve lands identified by reference characters 186, 188 and 190. Control pressure is distributed to the manual valve chamber through passage 136, and when the valve spool 184 assumes neutral position, which is indicated in FIGURE 2a, valve land 188 blocks the passage 136 thereby preventing distribution of fluid pressure to the various pressure operating elements of the circuit.

If it is assumed that valve spool 184 is moved from the neutral position shown to the primary drive range position $D^1$, control pressure will be distributed from passage 136 through the valve chamber to a passage 192 that in turn communicates with a passage 194 extending to the front clutch servo. The front clutch therefore is applied. Passage 192 also communicates with a passage 196 that extends to a hydraulic governor mechanism generally identified by reference character 198. Passage 196 also communicates with passage 200 extending to the upper end of a transition valve 202 having a valve land 204 which controls communication between passage 200 and a passage 206 extending to the apply side of a double acting front brake servo. When the transition valve 202 assumes an upward position, passage 206 communicates with an exhaust port located in the transition valve chamber adjacent valve land 204. When the transition valve spool assumes a downward position, control pressure passes through the transition valve chamber from passage 200 to passage 206 thereby causing the front servo to apply brake 110.

Control pressure is also distributed through the manual valve from passage 136 to a passage 208 which in turn extends to a 1–2 shift valve as indicated. The 1–2 shift valve includes a valve spool 210 reciprocally mounted within a cooperating valve chamber, and it includes valve lands 212, 214 and 216. Valve spool 210 is urged in an upward direction, as viewed in 2b, by a shift valve spring 218 acting between the valve body and the valve land 216, the latter being relatively large in diameter in comparison to valve lands 212 and 214. When the 1–2 shift valve spool 210 assumes the upward position shown in 2b, communication is established between passage 208 and a passage 220 extending to the inhibitor valve. However, when the 1–2 shift valve spool 210 assumes a downward position, passage 220 exhausts through the port located in the 1–2 shift valve chamber adjacent valve land 214, and passage 208 is blocked by land 212.

The lower end of the shift valve spool is subjected to a torque demand sensitive control signal which is supplied through passage 222, said signal establishing a fluid pressure valve actuating force which urges the 1–2 shift valve spool 210 in an upward direction to oppose the biasing action of spring 218. The upper end of the 1–2 shift valve chamber is supplied with a vehicle speed pressure signal through a governor pressure passage 224 which in turn communicates with a governor pressure passage 226 extending to the aforementioned governor 198.

The inhibitor valve comprises a multiple land valve spool 227 having spaced valve land 228, 230 and 232. Valve spool 227 is urged in an upward direction by a valve spring 234, and when it assumes the position shown in FIGURE 2b, communication is established between passage 220 and a passage 236, the former communicating with the latter through a portion of the inhibitor valve chamber between lands 228 and 230. When the inhibitor valve spool 227 assumes a downward position, passage 220 is blocked by land 228 and passage 236 is exhausted through the exhaust port in the inhibitor valve chamber adjacent valve land 230. Governor pressure passage 226 distributes governor pressure to the upper end of the inhibitor valve chamber through a branch passage 238 and this governor pressure urges the inhibitor valve spool in a downward direction against the opposing force of valve spring 234. A torque demand pressure signal is transmitted to the lower end of the inhibitor valve chamber through a throttle pressure passage 240, and this signal is caused to act on the differential area defined by adjacent valve lands 230 and 232, thereby urging the inhibitor valve spool 227 in an upward direction. The lowermost end of the valve spool 226 is subjected to the control pressure in passage 236, and a branch passage 242 is provided for this purpose. This same pressure is distributed to the lower end of the transition valve chamber through a branch passage 244. This pressure acts on a relatively large diameter valve land 246 of the transition valve so that the opposing fluid pressure force acting on valve land 204 will be overcome, thereby causing the transition valve to assume an upward position whenever passage 236 is pressurized. This takes place whenever the inhibitor valve assumes an upward position, as seen in FIGURE 2b.

Passage 236 extends to the rear servo lockout valve, and this valve includes a valve spool 248 having a pair of spaced valve lands 250 and 252. Valve spool 248 is urged in a downward direction by a lockout valve spring 254 and when valve spool 248 assumes a downward position, as seen in FIGURE 2b, passage 236 communicates with a passage 256 through the lockout valve chamber. Passage 256 in turn extends to the rear servo which is used for energizing brake 110. When valve spool 248 assumes an upward position, valve land 252 blocks passage 236 and causes passage 256 to communicate directly with the exhaust port associated with the lockout valve, said exhaust valve being uncovered by valve land 250.

The lower end of the rear servo lockout valve chamber communicates with a passage 258, and whenever passage 258 is pressurized a fluid pressure force acts on the lower end of the rear servo lockout valve spool 248 to urge the same in an upward direction against the opposing force of spring 254. Passage 258 communicates directly with the manual valve chamber and when the manual valve spool is shifted to the $D^1$ position passage 258 is connected to control pressure passage 136 through the manual valve chamber. In this instance manual valve 188 uncovers passage 136 and valve land 186 blocks the exhaust passageway through the end of the manual valve chamber. On the other hand, when the manual valve spool is shifted to the neutral, reverse or park position, passage 258 is exhausted through the end of the manual valve chamber and the rear servo lockout valve spring 248 will assume a downward position as illustrated in FIGURE 2b. It should also be noted that when the manual valve spool is shifted to the L position, valve land 186 will be shifted to the right hand side of passage 258, thereby causing passage 258 to be exhausted through the end of the manual valve chamber. The rear servo lockout valve will also assume a downward position in this instance.

When control pressure passage 136 is uncovered by valve land 188 as has been described, passage 192 extending to the front clutch is also pressurized since passage 192 then communicates with pressure passage 136 through the annular space defined in part by spaced valve lands 186 and 184. However, it is emphasized that valve land 186 will be situated on the left side of passage 192 when the manual valve spool assumes the L position, and the front clutch will therefore be pressurized whenever the manual valve spool assumes the $D^2$ position, the $D^1$ position or the L position. The front clutch is, however, exhausted through passages 194 and 192 and through the end of the manual valve chamber whenever the manual valve spool assumes the N, R or P positions.

When the rear servo lockout valve 248 assumes the downward position shown in FIGURE 2b, passage 236 is brought in direct communication with a passage 260 extending to the compensator valve. One portion of the compensator valve is thus pressurized with control pressure for a purpose subsequently to be described.

A 2–3 shift valve is used for controlling the transition from second gear ratio to third gear ratio, and vice versa. This valve includes a shift valve spool 262 having valve lands 264, 266 and 268, the diameter of valve land 268 being greater than the diameter of valve land 266. Control pressure is distributed to the 2–3 shift valve chamber through a branch passage 270 communicating with control pressure passage 258, and when the shift valve spool assumes the upward position shown in FIGURE 2b, passage 270 is blocked by valve land 266. A passage 272 also extends to the 2–3 shift valve chamber at a location spaced from passage 270 and this passage 272 communicates with the manual valve chamber at a location between valve lands 188 and 190. When the manual valve spool assumes the N, $D^2$, $D^1$ or L positions, passage 272 communicates with an exhaust port in the manual valve chamber, but when the manual valve spool is shifted to the R position, valve land 190 on the manual valve spool covers the exhaust port and valve land 188 uncovers control pressure passage 136 to provide direct communication between control pressure passage 136 and passage 272. When the manual valve spool is in the R position, passage 272 is pressurized and control pressure is thus distributed through the annular space defined in part by the valve lands 264 and 266 to a passage 274 extending to the pressure operated rear clutch servo. If the manual valve spool is shifted to any of the other positions, the rear clutch servo is exhausted through passage 274, through the 2–3 shift valve, through passage 272 and through the exhaust port formed in the manual valve chamber.

If the 2–3 shift valve spool is moved in a downward direction, valve land 266 uncovers passage 270 and valve land 264 blocks passage 272. The passage 270 is thus brought into communication with passage 274 to cause the rear clutch to become pressurized and engaged. The 2–3 shift valve spool 262 is urged in an upward direction by a valve spring 276 which is seated on a ported valve insert 278 located in the end of the shift valve chamber. The insert 278 is internally bored to receive a piston element 280 which acts directly on a shift valve spool. A throttle modulator valve plug 282 is also received within the bore of insert 278 and it is urged in a downward direction by a valve spring 284 situated between valve plug 282 and element 280.

A torque demand sensitive pressure signal is supplied to the lower end of the shift valve chamber through a passage 286, and this signal acts on the lower end of the throttle pressure modulator plug 282 to urge the same in an upward direction against the opposing force of spring 284. When the modulator throttle pressure exceeds a predetermined value, plug 282 uncovers the aforementioned passage 222 thereby causing this passage 222 to be pressurized with a reduced or modulated throttle pressure. This modulated throttle pressure acts on the lower end of valve element 280 to urge this element and the shift valve spool in an upward direction, a suitable branch passage 288 being provided for this purpose. Passage 256 communicates with the region of the 2–3 shift valve chamber occupied by valve spring 276, thereby causing the 2–3 shift valve to assume an upward position whenever passage 256 and the rear servo are pressurized. This disables the 2–3 shift valve and prevents an automatic upshift.

The governor, shown at 198, includes a sleeve type valve element 290 having spaced valve lands 292 and 294. This valve is disposed on one side of the axis of rotation of shaft 118 and is urged in an outward direction under the combined influence of the centrifugal force of a valve weight 296 and the weight of the valve element itself. Means are provided for canceling the centrifugal influence of the weight at high speeds of rotation of the shaft 118, thereby providing a different speed-pressure characteristic at high speeds than at lower speeds.

A control pressure passage 298 communicates with the governor valve chamber and it extends to the aforementioned control pressure passage 196. Valve land 294 controls the degree of communication between passage 298 and the aforementioned passage 226. The pressure in passage 226 is therefore a function of the speed of rotation of the shaft 118. The pressure in passage 226, hereinafter referred to as governor pressure, acts on the differential area defined by valve lands 292 and 294 to oppose the centrifugal valve operating forces.

Governor pressure is distributed through passage 226 to passages 224 and 238 as previously indicated, and this pressure acts on valve land 216 of the 1–2 shift valve to urge valve spool 210 in a downward direction. This same governor pressure is distributed to the 2–3 shift valve and acts on the differential area defined by lands 266 and 268 to urge the valve spool 262 in a downward direction. A branch passage 300 interconnects passage 226 and the 2–3 shift valve chamber for this purpose.

Branch passage 300 also communicates with a passage 302 which extends to the compensator valve as indicated. The manner in which the governor pressure influences the operation of the compensator valve will subsequently be explained.

The engine torque output pressure signal is produced by the throttle valve which comprises a valve spool 304 having a pair of valve lands 306 and 308. Valve spool 304 is slidably received within a cooperating valve opening, and it may be actuated by means of an engine manifold pressure operated servo mechanism which will be particularly described with reference to FIGURE 3. Control pressure is distributed to the throttle valve chamber through a passage 310 communicating with a branch passage 312 which in turn is connected to the control pressure passage 136. When the throttle valve spool 302 is moved in a left-hand direction, as viewed in FIGURE 2a, passage 312 is blocked by valve land 308, and similarly, an exhaust port in the throttle valve chamber is controlled by valve land 306. A throttle pressure passage 314 communicates with the throttle valve chamber at a position intermediate valve lands 306 and 308 and the throttle pressure in passage 314 is distributed to the right hand end of the throttle valve chamber so that it may act on valve land 308 to urge the valve spool 304 in a left-hand direction, as viewed in FIGURE 2a. The throttle pressure force acting on valve spool 304 opposes the valve actuating force of the aforementioned manifold pressure operated servo.

When the engine torque demand is increased upon movement of the engine carburetor throttle toward a wide open throttle position, the engine manifold pressure increases and this results in an increase in the valve operating force tending to urge valve spool 304 in a right-hand direction. This causes valve land 308 to uncover progressively passage 310 while simultaneously causing valve land 306 to restrict progressively the valve ports. This results in an increase in throttle pressure in passage 314. Conversely, when the engine torque output decreases upon a decrease in the engine carburetor throttle setting, valve spool 304 is urged in a left-hand direction, as viewed in FIGURE 2a, thereby progressively restricting passage 310 and simultaneously progressively opening the exhaust port. This results in a corresponding decrease in the magnitude of the throttle pressure in passage 314. Passage 314 extends past the compensator valve to a throttle booster valve which comprises a valve spool 316 having a pair of spaced valve lands 318 and 320 and the aforementioned passage 314 intersects the valve chamber intermediate these valve lands. Valve spool 316 is urged in a right-hand direction as viewed in FIGURE 2a, by valve spring 322 which is seated on a sleeve insert 324. Valve plug 326 is disposed within the sleeve insert 324 and a passage communicates with the left-hand end of the booster valve chamber for the purpose of distributing throttle pressure to the left-hand end of the valve plug 326.

Passage 314 communicates with passage 328 through the annular space defined in part by the spaced valve lands 318 and 320 and by a branch passage 330. The pressure which exists in the annular space between valve lands 318 and 320 is distributed to the right-hand end of the booster valve spool by means of a branch passage 332. Control pressure is distributed to the booster valve chamber through a passage 334 which communicates with control pressure passage 136. When the booster valve spool 316 is in a right-hand position, as viewed in FIGURE 2a, valve land 318 blocks this passage 334. The booster valve above described is illustrated in more particular detail in FIGURE 5a.

Figures 3, 4, 5A, 5B:
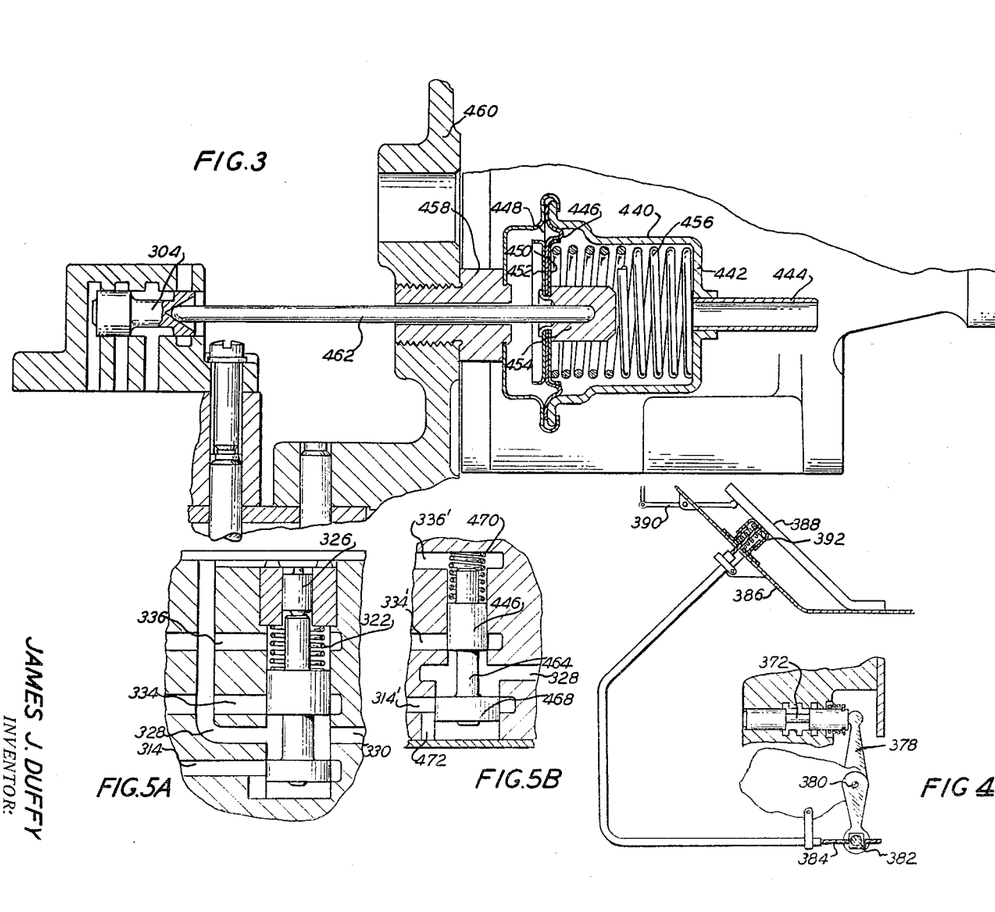

Referring next to FIGURE 5a, it will be apparent that the valve spool 316 will assume a downward position whenever the magnitude of the throttle pressure made available by the throttle valve is below a calibrated value. In this instance, passage 314 will freely communicate with passage 330 through the booster valve chamber and the control pressure passage 334 will be blocked. It should be noted that the chamber occupied by spring 322 is open to exhaust by means of an exhaust port 336. However, when the magnitude of the throttle pressure made available by the throttle valve increases beyond a desired value, the throttle pressure force acting on the lower end of the booster valve spool, as shown in FIGURE 5a, will urge the valve spool upwardly, thereby causing the spring to yield. The valve land 318 will then progressively uncover control pressure land 334 and throttle pressure passage 314 will be progressively restricted by valve land 320. It is thus apparent that a regulated control pressure will be made available to passages 330, 328 and 286 and this supplements the throttle pressure which is supplied to the passages 330, 328 and 286 by passage 314. Although the pressure signal which is made available to the shift valves may be referred to as an engine torque output sensitive signal, the pressure signal supplied by the source is amplified, as above indicated. During operation of the vehicle at advanced engine throttle settings the pressure signal source is amplified by the control pressure pumps, but during operation at low engine throttle settings the sole source is the throttle valve, as above explained.

A passage 338 communicates with passage 286 and it extends to the right-hand end of a 3–2 coasting control valve chamber. The 3–2 coasting control valve includes a valve spool 340 with spaced valve lands 342 and 344. The valve spool 340 is urged in a right-hand direction, as seen in FIGURE 2a, by a valve spring 346, the chamber occupied by the valve spring being exhausted as indicated.

A passage 348 communicates with the 3-2 coasting control valve chamber intermediate valve lands 342 and 344 and it extends to the release side of the double acting front brake servo. The pressure transmitted to the front brake servo by passage 348 causes the servo to move toward a brake releasing position.

Passage 350 is also connected to the 3-2 coasting control valve chamber at a location adjacent passage 348, and when the valve spool 340 is in a right-hand position, as shown in FIGURE 2a, valve spool 340 blocks the passage 350. When throttle pressure is available in passage 196, the valve spool 340 is urged in a left-hand direction against the opposing force of spring 346, thereby establishing free communication between passages 348 and 350. This occurs whenever the engine throttle is advanced to an open or partially open position since the 3-2 coasting control valve is calibrated so that it will shift under all driving conditions other than a closed throttle condition.

Passages 348 and 350 are interconnected by a fixed flow restricting orifice 352, and during closed throttle operation the restriction 352 provides the sole means for transferring fluid between passages 348 and 350.

Passage 350 extends to one side of a 3-2 kickdown control valve chamber within which is situated a movable valve spool 354 having spaced valve lands 356 and 358. A precalibrated flow restricting orifice 360 is situated in passage 350 as indicated. A passage 362 communicates with the valve chamber associated with valve spool 354 and valve land 356 controls the degree of communication between passage 350 and passage 362. A spring 364 normally biases valve spool 354 toward an open position. Passage 362 in turn communicates with passage 274 extending to the rear clutch servo and it is connected to a branch passage 366 by means of a one-way check valve 368, said valve permitting one-way fluid flow from passage 362 to passage 366 and inhibiting a reverse flow. Passage 366 in turn communicates with passage 348. The lower end of the valve chamber for the 3-2 kickdown control valve is in communication with passage 348 and the pressure in the passage urges the valve spool 354 in an upward direction, as viewed in FIGURE 2b, against the opposing force of spring 364.

The diameter of valve land 366 is greater than the diameter of valve land 358 and the differential area defined thereby is subjected to governor pressure by reason of the connection of passage 226 to the 3-2 kickdown control valve chamber. The governor pressure therefore tends to urge valve spool 354 toward a passage closing position and it assists the fluid pressure force created by the pressure acting on the lower end of valve land 358. Valve spool 354 is therefore subjected to two separate fluid pressure forces, one force being due to the governor pressure and the other force being created by the pressure differential across orifice 360 when fluid flows from passage 348 to passage 350 and then through orifice 360 to passage 362. Another by-pass orifice 370 is situated between passages 350 and 362, and it is adapted to by-pass the 3-2 kickdown control valve chamber to establish a minimum flow from passage 350 to passage 362 under those extreme driving conditions in which valve spool 354 is in a fully closed position.

A down-shift valve spool is identified by reference character 372 and it includes a pair of valve lands 374 and 376 situated within a down-shift valve opening. The valve spool 372 may be reciprocated by means of a mechanical linkage mechanism shown in part at 378, and this mechanism is under the control of the vehicle operator. As best seen in FIGURE 4, element 378 comprises a crank pivotally mounted at 380 to the stationary valve body, and the other end thereof is mechanically connected at 382 to a push-pull cable 384, as schematically illustrated in FIGURE 4. The other end of the cable may be connected by means of suitable brackets to the forward body panel 386. An accelerator pedal is shown at 388 and it forms a part of the engine carburetor throttle linkage mechanism, another element of this linkage mechanism being shown at 390. The upper end of the push-pull cable 384 may include a plunger 392 which is spring urged in an upward direction and which may be depressed by the vehicle operator when the accelerator 388 is moved downward to an open throttle position. This causes a counterclockwise movement of the lever 378 and the down-shift valve spool 372 is accordingly moved inwardly. If desired a valve spring 393 may be provided as indicated to normally urge the valve spool 372 outwardly.

During normal forward driving operation of the transmission mechanism the down-shift valve spool 372 is positioned so that valve land 376 covers branch passage 394 communicating with control pressure passage 312. A passage 396 communicates with the down-shift valve chamber adjacent valve land 374 and it extends to a branch passage 398 communicating with th manual valve chamber and with the exhaust port associated with the manual valve. When the manual valve is in the N, D², or D¹ positions, passages 396 and 398 are exhausted through the manual valve chamber. Passage 396 also communicates with the 1-2 shift valve chamber at a location below the 1-2 shift valve land 216 thereby normally exhausting the fluid pressure in the chamber occupied by valve spring 218. Another passage 400 communicates with the down-shift valve chamber adjacent passage 396, and when the valve spool 372 is positioned as shown the down-shift valve establishes communication between passages 396 and 400. Passage 400 in turn extends to and communicates with passage 240 which leads to the lower end of the inhibitor valve chamber as previously described. Passage 400 also communicates with the interior of the sleeve insert 278 in the 2-3 shift valve so that during normal forward drive operation passage 400 serves as an exhaust conduit for the throttle pressure modulator valve plug 282 thereby permitting pressure regulation to take place.

If the vehicle operator opens the engine carburetor throttle to its maximum setting, the downshift valve spool 372 is shifted until valve land 376 uncovers passage 394 and valve land 374 covers passage 396. Passage 400 is thereby pressurized with control pressure and this pressure is distributed to the lower end of the inhibitor valve to urge the same in an upward direction as viewed in FIGURE 2b. Control pressure is also distributed through passage 400 to the lower end of the 2-3 shift valve thereby urging valve plug 280 and the shift valve 262 in an upward direction. This same pressure is applied to the lower end of the 1-2 shift valve to assist the valve spring 218.

The manual valve is moved to the L position at normal carburetor throttle settings, and control pressure is distributed through the manual valve from control pressure passage 136 through passages 398 and 396. The control pressure assists the 1-2 shift valve spring 298 in maintaining the 1-2 shift valve spool 210 in an upward or fully down-shifted position. Control pressure is also distributed from passage 396 to passage 400 through the down-shift valve chamber and the 2-3 shift valve is also urged toward an upward or down-shifted position. The existence of control pressure in the 1-2 shift valve chamber and the 2-3 shift valve chamber disables the transmission controls and inhibits automatic up-shifts from the lowest gear ratio. However, it should be noted that passage 258 is exhausted through the open end of the manual valve since valve land 186 will in this instance be on the right-hand side of the passage 258, and this exhausts the lower end of the rear servo lockout valve chamber. The rear servo lockout valve chamber will be urged in a downward direction during operation in the L range. The inhibitor valve spool 227 assumes an upward position as previously explained, and this allows control pressure to be distributed to passage 236 from pressurized passage 220, the latter communicating with passage 208 through the down-shifted 1–2 shift valve. Control pressure is distributed to passage 208 by the manual valve.

Since passage 236 is pressurized as above pointed out, fluid pressure is distributed to passage 256 through the rear servo lockout valve and this passage 256 communicates with the rear servo, thereby energizing the same. Control pressure is also distributed from passage 256 to the lower end of the 2–3 shift valve through branch passage 402. The 2–3 shift valve is therefore maintained in a down-shifted position and the rear servo is energized to anchor the planetary carrier for the transmission mechanism. The rear brake therefore serves as a reaction member during operation in the L drive range, and since the rear brake is double acting, engine braking may be readily accomplished.

The aforementioned passage 260 also communicates with the rear servo lockout valve and it is pressurized when the rear servo lockout valve spool 248 assumes a down-shifted position as shown in FIGURE 2b. The pressure thus distributed to passage 20 acts on the compensator valve assembly which will now be described.

The pressure regulator mechanism for the circuit herein disclosed includes a compensator valve comprising a multiple land valve spool 404 having four spaced valve lands 406, 408, 410 and 412. Valve spool 404 is positioned within a cooperating compensator valve chamber which is supplied with control pressure from a branch passage 414 communicating with passage 312. The previously described compensator pressure passage 160 includes portions 418 and 420 extending to spaced locations in the compensator valve chamber. Valve land 408 is adapted to control the degree of communication between passages 414 and 418, and the valve land 406 is adapted to control the degree of communication between passage 414 and a cooperating exhaust port in the compensator valve chamber. The valve spool 404 is urged in a right-hand direction as viewed in FIGURE 2a by a compensator valve spring 422 and this valve biasing force tends to uncover passage 414 and to cover the exhaust port thereby causing compenstor pressure passage 160 and compensator pressure passage portions 418 and 420 to become pressurized. This pressure acts on a differenial area defined by adjacent valve lands 408 and 410, thereby establishing a compensator pressure force on the valve spool 404 which opposes the valve biasing effort of spring 422. It is thus apparent that pressure regulation will take place within the compensator valve mechanism and the passage 160 will be pressurized with a modulated pressure which will hereinafter be referred to as compensator pressure.

The left end of the compensator valve chamber as viewed in FIGURE 2a has situated therein a valve sleeve 424 within which is positioned a governor valve plug 426. The above-mentioned governor pressure passage 302 extends to the left-hand side of the compensator valve chamber and its acts on valve plug 246 to urge the same in a right-hand direction. This pressure force is opposed by a valve spring 428 situated between valve plug 426 and the valve spool 404.

Another governor valve plug 430 is situated at the right-hand end of the compensator valve chamber and it is movably disposed within the cooperating bore. Valve plug 430 includes a valve land 432 and a valve land 434, the diameter of the former being greater than the diameter of the latter. Control pressure is distributed to the differenial area defined by valve lands 432 and 434, a branch passage 436 communicating with passage 312 communicating with the bore for valve plug 430 for this purpose. Governor pressure is also distributed to the right-hand end of the valve plug 430 through a branch passage 438 that communicates with governor pressure passage 302.

The compensator valve spool 404 is also subjected to transmission throttle pressure and this throttle pressure is distributed to the compensator valve chamber through the aforementioned throttle pressure passage 314 at a location adjacent valve lands 410 and 412. This throttle pressure acts on the differential area defined by valve lands 410 and 412 to urge the compensator valve spool 404 in a left-hand direction to assist the valve biasing effort of the compensator pressure acting on the differential areas defined by valve lands 408 and 410.

Compensator pressure is distributed through passage 160 to the lower end of each of the regulator valves 132 and 166. If the engine carburetor throttle setting is increased, this results in an increase in throttle pressure in passage 314 as previously indicated and the compensator valve spool 404 will then be urged in a left-hand direction with a greater fluid pressure force. This has a tendency to reduce the regulated compensator pressure in passage 160 and this results in a decrease in the compensator pressure force acting on the regulator valves. This results in an increase in line pressure. On the other hand, if the throttle pressure in passage 314 is decreased upon a clearance in engine throttle carburetor opening, the regulating characteristics of the compensator valve are altered so that the compensator pressure in passage 160 is increased. This increased compensator pressure acting on the regulator valve results in a decrease in the control pressure made available to the circuit. The torque transmitting capacities of the pressure operated servos of the transmission will then be varied in accordance with the engine torque.

If the vehicle speed increases for any given engine carburetor throttle valve setting, the governor pressure force acting on the governor pressure plug 426 will increase and this force in turn is transmitted to the compensator valve spool 404 through spring 422. This tends to increase the degree of communication between passages 414 and 160 and the resulting change in the regulating characteristics of the compensator valve produces an increase in the compensator pressure. As previously explained this increase in compensator pressure results in a decrease in the control pressure made available by the pressure regulator valves.

If the vehicle speed continues to increase to a relatively high value, the compensator pressure in passage 160 would normally tend to increase. However, it is undesirable to allow the compensator pressure to increase beyond a value which will result in slippage of the torque transmitting elements of the pressure operated servos due to a corresponding reduction in control pressure. To overcome this undesirable condition the governor valve plug 430 is calibrated so that when the vehicle speed increases to a limiting value for any given control pressure, the governor plug 430 will be shifted in a left-hand direction against the control pressure acting on the differential area defined by valve lands 432 and 434. The governor pressure force acting on valve land 432 will therefore be transmitted directly to valve land 434 and this force opposes and cancels the governor pressure force acting on the governor valve plug 426. The compensator valve mechanism is thereafter insensitive to changes in vehicle speed.

When the transmission is conditioned for reverse operation or for operation in the L drive range, passage 258 is exhausted as previously explained. The passage 260 therefore becomes pressurized since the rear servo lockout valve is shifted in a downward direction as viewed in FIGURE 2b. The pressure thus distributed to passage 260 acts on the right-hand end of the compensator valve spool 404 to supplement the biasing action of the throttle valve pressure. This results in a substantial decrease in compensator pressure and a corresponding substantial increase in control pressure. The capacities of the fluid pressure operated transmission servos are therefore increased so that the increased torque delivery requirements of the transmission clutches and brakes will be satisfied.

Referring next to FIGURE 3, the throttle valve and the mechanism for actuating the same is shown in more particular detail. This actuating mechanism comprises an enclosure 440 which may be cylindrical in shape as indicated in FIGURE 3. One end thereof is enclosed by a wall 442 to which is connected a conduit fitting 444. Conduit fitting 444 may be fixed within a cooperating aperture in wall 442 by welding, by brazing or by other suitable means. A suitable conduit may then extend from fitting 444 to the engine intake manifold of the engine so that the interior of the enclosure 440 will be pressurized with engine intake manifold pressure.

One end of the enclosure 440 is enclosed by a flexible diaphragm 446 which may extend over the edge of the enclosure 440 and which may be held in place by a suitable crimped plate 448. Diaphragm back-up washers 450 and 452 may be connected to opposed sides of the diaphragm 446 and they may be secured in place by means of a centrally disposed adaptor 454. The adaptor 454 extends through a central aperture in the diaphragm 446 and in the washers 450 and 452, and the terminal part of the extension for adaptor 454 is turned over the adjacent inner margin of the washer 452, thereby clamping the diaphragm assembly to the body of the adaptor 454. A spring 456 is disposed within the enclosure 440 and it acts against the diaphragm assembly to urge the same in a left-hand direction as viewed in FIGURE 3.

Plate 448 carries a threaded mounting adaptor 458 which may be threadably received within a cooperating opening which is formed in a portion 460 of the rearward wall structure of the transmission housing.

Adapter 458 is formed within a cylinder opening through which a transmission throttle valve actuator rod 462 extends. The rod 462 forms a mechanical connection between the diaphragm assembly and the throttle valve spool 304. The plate 448 is fixed to the adapter 458 and the enclosure 440 is supported in the exterior of the transmission housing in this fashion. The adapter 458 extends through a central opening formed in plate 448 and the terminal part thereof is deformed so that it overlies the periphery of the central opening.

Referring next to FIGURE 5b, I have illustrated a modified form of the throttle booster valve, and it comprises a single valve spool 464 having a pair of valve lands 466 and 468 of dissimilar diameters. A valve spring 470 biases the valve spool 464 in a downward direction within the booster valve chamber, the latter being formed with internal valve lands which cooperate with the aforementioned valve lands 466 and 468.

Throttle pressure is admitted to the lower end of the booster valve chamber through a passage identified by reference character 314'. This passage 314' forms a counterpart for the above-described throttle pressure passage 314. The throttle booster valve chamber may be grooved, as shown at 472, to allow throttle pressure to be admitted to the lower end of the throttle booster valve chamber where it acts on the relatively large diameter valve land 468. Control pressure is distributed to the throttle booster valve chamber through a passage identified by reference character 334'. This passage 334' corresponds to the aforementioned control pressure passage 334 described with reference to the embodiment of FIGURE 5a.

The upper end of the throttle booster valve chamber shown in FIGURE 5b is exhausted through an exhaust port shown at 336'.

During operation of the valve of the embodiment of FIGURE 5b, throttle pressure is normally distributed directly from throttle pressure passage 314' to an outlet passage 328' which in turn extends to a transmission shift valve mechanism. The passage 328' forms a counterpart for the above-described passage 328 when the engine is operated at relatively reduced carburetor throttle settings. The pressure in passage 328' is the same in magnitude as the throttle pressure made available to throttle pressure passage 314. However, at more advanced engine carburetor throttle settings the valve spool 464 will be urged in an upward direction, thereby causing valve land 468 to restrict passage 314' and to simultaneously cause valve land 466 to uncover control pressure passage 334'. The pressure signal in outlet passage 328' is thereby supplemented by line pressure whenever the transmission throttle pressure exceeds the calibrated limiting value.

In order to very briefly describe the function of certain principal elements of the control circuit heretofore described, an operating shift sequence will be outlined. For purposes of discussion it will be assumed that the manual valve is in the $D^1$ position and that the vehicle is initially at rest with the engine idling. Under such conditions the engine manifold pressure is at a minimum value and the diaphragm assembly of the throttle valve actuator mechanism shown in FIGURE 3 will therefore be urged under the influence of atmospheric pressure in a right-hand direction against the force of spring 456. The throttle valve spool 304 will in this instance be urged in a left-hand direction as viewed in FIGURE 2a, and the throttle pressure existing in passage 314 will therefore be substantially zero in magnitude. The 1–2 shift valve will assume an upward position as shown in FIGURE 2b and control pressure will then be distributed through passage 208, through the 1–2 shift valve, through passage 229, through the inhibitor valve, which in this instance is in an upward position, as viewed in FIGURE 2b, to the lower end of the transition valve. The rear servo lockout valve will assume an upward position as previously explained. Control pressure is distributed directly to the front clutch through passages 192 and 194. Transfer of fluid pressure to the rear servo is blocked by the rear servo lockout valve, and the rear servo is exhausted through the exhaust port in the rear servo lockout valve. The rear clutch is exhausted through passage 274, through the 2–3 shift valve, through passage 272 and through the exhaust port in the manual valve. The apply side of the front servo is exhausted through passage 206 and through the exhaust port in the transition valve. The release side of the front servo is exhausted through passage 348, passage 350, passage 362, passage 374, the 2–3 shift valve, passage 272 and the exhaust port of the manual valve.

Since the front clutch is the only servo which is energized, the transmission will move forward in the low speed drive range as previously explained, the overrunning brake 116 providing the necessary torque reaction of the planetary carrier. When the engine carburetor throttle for the vehicle is moved to an intermediate setting, a corresponding increase in engine intake manifold pressure takes place and this causes the throttle valve actuator mechanism to urge throttle valve spool 304 in a right-hand direction as viewed in FIGURE 2a. This results in an increase in throttle pressure in passage 314. This throttle pressure is distributed through the throttle booster valve and through passage 286, which in turn communicates with the throttle modulator valve plug 282. The modulated throttle pressure produced by the valve plug 282 acts on the lower ends of each of the shift valves tending to maintain each of these valves in a down-shift position.

If it is assumed that the vehicle engine accelerates at a given carburetor throttle setting, the governor pressure in passage 226 will progressively increase in magnitude and the resulting upshifting tendencies produced by the governor pressure acting on the 1–2 shift valve and 2–3 shift valve will progressively increase. When the 1–2 shift point is reached for any given throttle setting, the 1–2 shift valve will move in a downward direction, as viewed in FIGURE 2b, and this opens passage 220 to the exhaust port in the 1–2 shift valve. The control pressure acting on the lower end of the transition valve is also exhausted in this fashion and the transition valve therefore moves in a downward direction as viewed in FIGURE 2b, thus causing control pressure to be transferred from passage 200 to the passage 206 extending to the apply side of the front servo. Since the brake band 64 and the front clutch are simultaneously applied the transmission is conditioned for second gear operation.

Upon a further increase in vehicle speed for a given throttle setting, the magnitude of the governor pressure will cause the 2–3 shift valve to move downwardly to an upshift position and this establishes communication between passage 270 and passage 274, thereby causing the rear clutch to be pressurized.

Passage 270 communicates with passage 258 which in turn extends to the manual valve. When passage 274 is pressurized in this fashion, control pressure is distributed to passage 362 and through the one-way check valve 368 to passage 348, the latter extending to the release side of the front servo. Since both sides of the front servo are pressurized, the front band is released and the transmission mechanism is thus conditioned for operation in the third gear ratio.

If the vehicle operator suddenly opens the carburetor throttle, the transmission throttle valve pressure increases, and if this increase is of a sufficient magnitude, the 2–3 shift valve will be moved upwardly to a downshift position thereby causing the rear clutch to be exhausted through passage 274, through the 2–3 shift valve, through passage 272 and through the exhaust port in the manual valve. Also, the release side of the front servo will be exhausted through passage 348, passage 350, through the annular opening controlled valve land 356 of the 3–2 kickdown valve, through passage 362, through passage 374, through the 2–3 shift valve and through the passage 272 extending to the manual valve.

The 3–2 coasting control valve is shifted in a left-hand direction under these conditions since the passage 358 is subjected to throttle pressure and passage 348 therefore communicates with passage 350 through the 3–2 coasting control valve chamber. The 3–2 kickdown valve provides a controlled degree of restriction in the exhaust flow path for the release side of the front servo. As previously indicated, the degree of restriction provided by the 3–2 control valve is determined by the pressure drop across the orifice 360 and also by the magnitude of the governor pressure acting on the 3–2 kickdown control valve spool. The application of the front band will therefore be delayed somewhat following the initial disengagement of the rear clutch, and this delay is sufficient to permit the engine to accelerate to the higher speed which is necessary for operation in the downshift ratio.

If the vehicle is coasted in high gear with a closed engine throttle, the 3–2 coasting control valve will assume the position shown in FIGURE 2a. When the vehicle decelerates to the required degree, the 2–3 shift valve will then move from the high speed upshift position to the low speed downshift position. The rear clutch and the release side of the front servo will then be exhausted through the fluid flow path previously described with reference to a forced downshift. However, since the 3–2 coasting control valve is in the position shown in FIGURE 2a, the only communication between passages 348 and 350 is that which is established by flow restriction 352, and the rate of engagement of the front band will therefore be substantially delayed and the engagement itself will be cushioned. This avoids an undesirably rough downshift.

If the manual valve is shifted to the D² position, passage 208 is exhausted through an exhaust port manual valve. Control pressure is therefore made unavailable to the 1–2 shift valve since the passage 208 is likewise exhausted. Since this is the case, the lower end of the transition valve will be continuously exhausted and control pressure will thus be made available to passage 206 regardless of the vehicle speed or carburetor throttle setting. The front servo is therefore applied and the transmission will therefore not be allowed to downshift into the first gear ratio.

Figure 7:
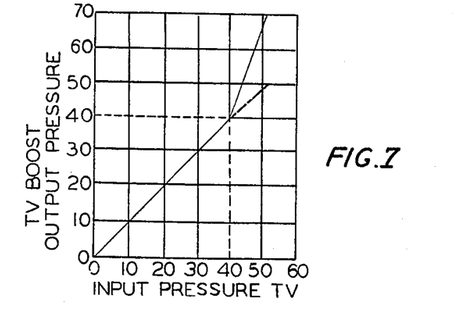
FIGURE 7 is a graphical representation of the relationship between throttle pressure and carburetor opening.

Referring next to FIGURE 7, I have illustrated graphically the relationship between the magnitude of the throttle pressure which exists in passage 314 and the magnitude of the pressure signal which exists in passage 328. It will be observed that at a throttle pressure corresponding to an intermediate carburetor throttle valve setting, the pressure in passage 328 is the same as that which exists in passage 314. However, when the magnitude of the throttle pressure in passage 314 reaches a calibrated value, such as 40 p.s.i., passage 314 becomes progressively restricted by valve land 320 and control pressure passage 334 becomes progressively uncovered by valve land 318. The resulting pressure in passage 328 therefore increases to a total value which is greater than the magnitude of the pressure in passage 314.

Figure 6:
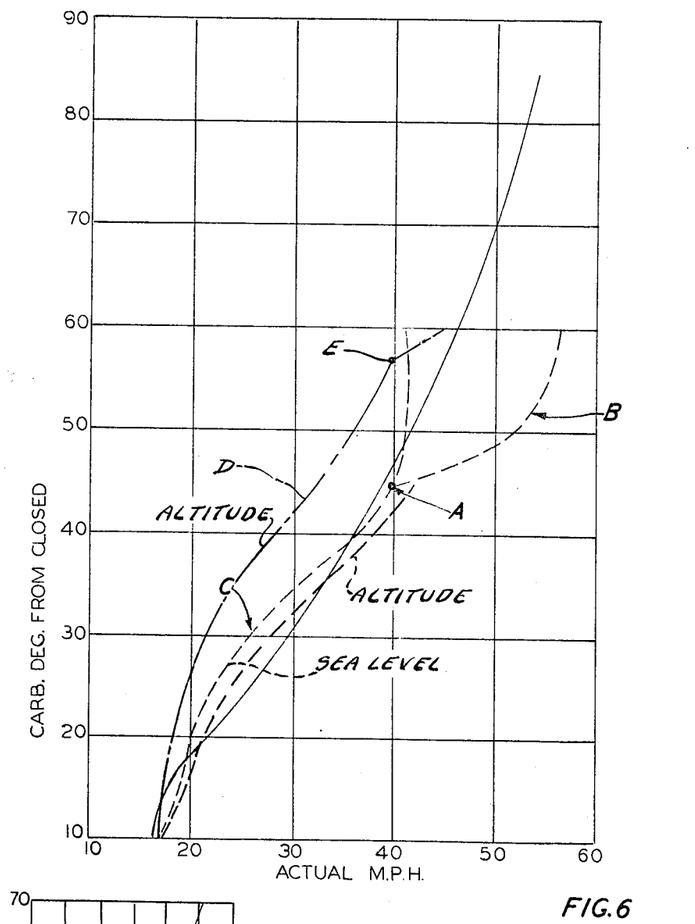
FIGURE 6 is a graphical representation of the variation in the upshift point for any given vehicle speed and carburetor setting.

Referring next to FIGURE 6, I have graphically illustrated the relationship between actual m.p.h. and the carburetor throttle setting. This graph represents the locus of the 2–3 shift points which are obtained at the various carburetor throttle settings. For purposes of comparison, the full line graph represents the 2–3 shift points which are obtained with a conventional linkage type throttle valve actuating mechanism. It will be observed that the shift point progressively increases as the vehicle is accelerated at progressively increasing throttle settings. This is due to the fact that the throttle pressure varies in accordance with accelerator movement. The shift points shown in FIGURE 6 were obtained under test conditions by accelerating the vehicle with a fixed engine throttle setting and then recording the shift point. A different shift point was obtained for each throttle setting.

As previously indicated in the introductory portion of the specification, the engine intake manifold pressure does not increase appreciably when the vehicle carburetor throttle setting is increased beyond mid-range, such as a 60° blade opening. The variation in 2–3 shift points for various carburetor throttle settings for the control system herein described is represented in FIGURE 6 by means of dashed lines. It will be observed that the shift point curve would normally tend to increase for various carburetor throttle settings up to approximately 41 m.p.h. and further increases in carburetor throttle setting would not result in a corresponding increase in the shift point. However, my system may be calibrated so that a break point will occur at the location designated in FIGURE 6 by the letter A. When this point occurs, the valve land 320 of the throttle booster valve begins to restrict passage 314 and passage 334 begins to be uncovered. This results in an increase in the pressure in passage 328 as previously explained. Further increases in carburetor throttle setting will cause a further increase in pressure signal in passage 328, and this in turn results in a substantial delay in the 2–3 shift point as indicated by the substantially reduced slope in the dashed curve of FIGURE 6. The portion of reduced slope is designated by the letter B. It will be noted that the "to detent" 2–3 shift point occurs at substantially the same speed as the "to detent" shift point which is normally obtained with a conventional mechanical linkage throttle valve mechanism. The portion of the dashed line curve appearing below the break point A is designated by the reference letter C, and it will be observed that the variation in shift point with varying carburetor throttle settings along curve C is quite similar to that which is obtained with a straight mechanical linkage mechanism, the latter being shown by the full line curve.

During operation along the curve C the engine torque will vary in a substantially direct fashion with carburetor throttle movement, and this variation is similar to that variation which exists between engine torque and engine intake manifold pressure. Although engine manifold pressure is a more accurate indicator of engine torque, carburetor throttle movement may also be used as an approximate indicator of engine torque during initial movement of the carburetor throttle.

Shown also in FIGURE 6 is a second curve C that indicates the relationship between shift points at various carburetor throttle settings when a servo of the type shown in FIGURE 3 is employed. It will be observed that the shift point is increased as the altitude increases for each carburetor setting between 0° and approximately 45°.

Figures 8, 9:
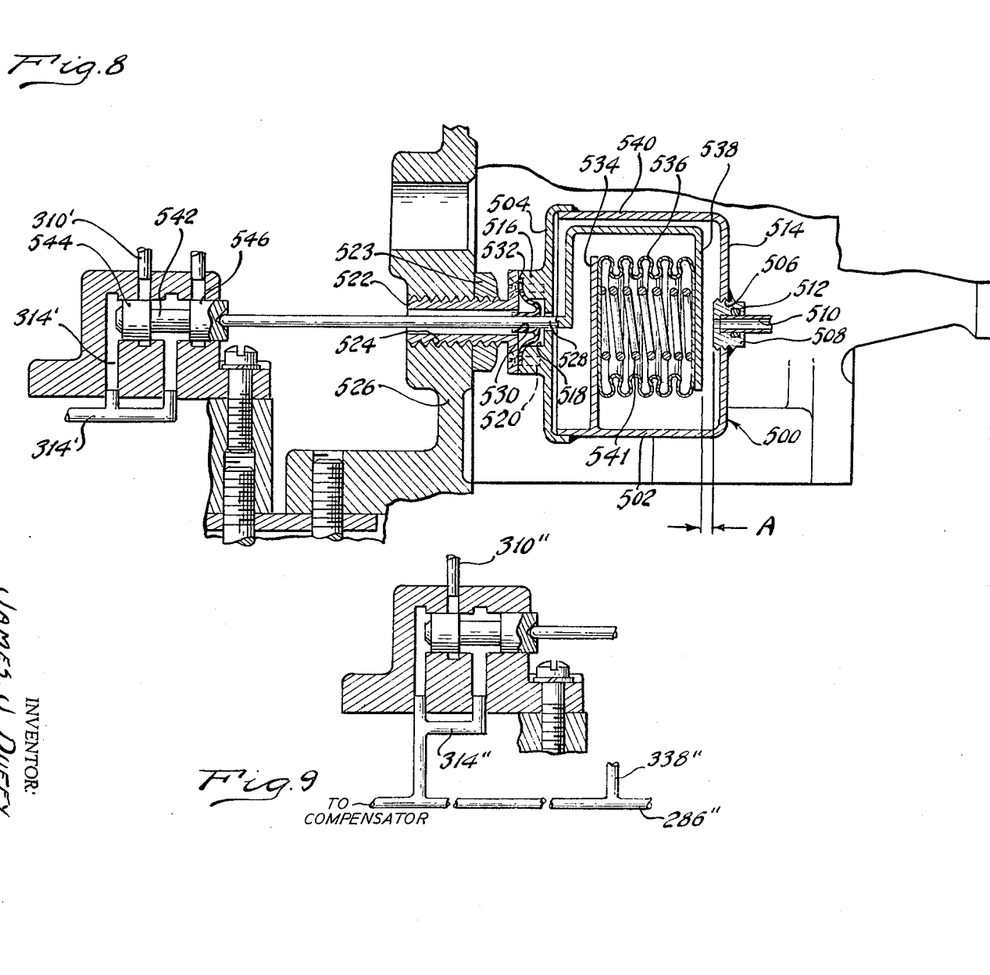
FIGURE 8 is a view showing a modified form of servo for actuating the transmission throttle valve. It is responsive to changes in the absolute manifold pressure.
FIGURE 9 is a view showing a modified valve arrangement for use with the servo of FIGURE 8.

Referring next to FIGURE 8, I have indicated a throttle valve servo that is responsive to absolute engine intake manifold pressure. If the servo is used in place of the servo shown in FIGURE 3, and if we assume that both servos are calibrated to produce the same operating characteristics, the shift point curve will be designated by the sea level curve C of FIGURE 6 when the vehicle is operated at sea level. If the vehicle is operated at altitude, however, the shift point curve will be shifted to the left as indicated by the curve D of FIGURE 6. This is the opposite effect than the effect of altitude upon the servo of FIGURE 3.

The upshift then is delayed for each carburetor setting. The mechanism will operate in a fashion similar to the operation of the mechanism of FIGURE 3 and the booster valve mechanism will begin to function when point E is reached. At this time the degree of delay of the shift points is modified.

For the purpose of describing more particularly the mechanism of FIGURES 8 and 9, an absolute manifold pressure sensitive servo is designated in FIGURE 8 by reference character 500. It includes a shell or housing 502. An end plate 504 can be secured to the open end of the shell 502 and can be welded as indicated to form a unitary enclosure.

The shell 502 is formed with a threaded opening 506 within which is fitted an externally threaded adaptor 508 to which is connected an engine manifold pressure passage 510. A suitable seal 512 is provided as indicated.

The passage 510 extends to the engine intake manifold and communicates through a port in the adaptor 508 with the interior 514 of the servo 500.

The central hub of plate 504 includes a boss 516 having a seal recess 518. Connected to boss 516 is a threaded adaptor 520 having an extension 522 that is received threadably within a threaded opening 524 formed in the transmission housing 526. A releasable lock nut 523 secures the extension 522 to the housing in a fixed fashion.

Extension 522 and boss 516 are apertured to receive therethrough a throttle valve actuating stem 528.

A diaphragm seal 530 surrounds stem 528. The seal includes a radially outwardly extending diaphragm part 532 that is held fast between the adaptor 520 and the boss 516. The seal recess 518 will permit freedom of movement of the seal 530.

It will be apparent, therefore, that the stem 528 can move axially with respect to the servo 500 with a minimum amount of friction since there is no sliding sealing surfaces between the stem 528 and the seal structure. The material of which the seal 530 is formed can be made sufficiently flexible to permit shifting movement of the stem 528 with a minimum amount of effort.

Secured within the interior 514 of the servo shell 502 is a wall 534. Seated against the wall 534 is one end of an aneroid bellows 536 which may be formed of flexible metal having a generally cylindrical shape, the cylindrical wall being undulated as indicated. The opposite end of the bellows 536 is seated upon a bracket 538. This bracket extends over the bellows and around the wall 534 as indicated, the extended portion thereof being shown at 540. This extension is connected as shown to the inner end of the stem 528.

Air is evacuated completely from the interior of the bellows. Calibrating spring 541 can be provided in the bellows.

It will be apparent from the foregoing that the interior 514 of the servo 500 is subjected to engine intake manifold pressure. This same pressure, however, is exerted upon the exterior of the bellows. At any given barometric pressure the pressure within the interior 514 of the servo 500 is directly related to engine output torque.

The actuating rod for stem 528 engages the throttle valve 542. This valve includes spaced valve lands 544 and 546. The throttle valve 542 is situated within a throttle valve chamber which communicates with a line pressure passage 310'. This passage corresponds to passage 310 in the circuit of FIGURES 2 and 2a. Communicating also with the throttle valve chamber is a passage 314' which corresponds in function to throttle pressure passage 314 in the circuit of FIGURES 2a and 2b. An exhaust port communicates with the throttle valve chamber as in the previous embodiment.

The throttle pressure that exists in passage 314' then increases with changes in the engine output torque.

In the embodiment of FIGURE 9, the booster valve feature is eliminated and the passage extending from the throttle valve communicates directly with the passage 338'' and passage 286''. These passages 338'' and 386'' correspond respectively to passages 338 and 286 in the embodiment of FIGURES 2a and 2b. The passage 314'', which is subjected to throttle pressure in this embodiment corresponds to passage 314 in the embodiment of FIGURES 2a and 2b. Line pressure passage 310'' also communicates with a throttle valve chamber that corresponds to passage 310 in the embodiment of FIGURES 2a and 2b.

If a circuit of the type shown in FIGURE 9 were to be employed, the characteristic shift points would be plotted as indicated by the line D in FIGURE 6 although the brake point E would not occur. The greater the reduction of barometric pressure, the greater will be the degree that the shift point curve will be shifted to the left as indicated in FIGURE 6. The calibration of the aneroid bellows can be changed to suit the characteristic shift point curve that is desired. Although the shift points are delayed as indicated in FIGURE 6, the actual engine torque at each shift point remains unchanged if the system is calibrated with 100% altitude compensation in this fashion. If we take into account, however, the reduction in back pressure on the engine during operation at altitude, a slight increase in torque at the shift point will occur, but this increase is not of sufficient magnitude to affect adversely the quality of the shift.

The servo of FIGURE 8 can be adjusted by loosening the locking nut and turning the shell until the working gap "A" is zero. If this is done while the engine is idling, an abrupt rise in throttle pressure will be noted. The shell then can be turned back a specific number of turns corresponding to the number of turns which will produce the design working gap. The shell then is locked in place.

Having thus described certain preferred embodiments of my invention, what I claim and desire to secure by U.S. Letters Patent is:

1. In a power transmission mechanism adapted to transfer driving torque from an engine to a driven member, said engine including an air intake manifold, a fluid pressure source, fluid pressure operated servo means for controlling the motion of torque delivery elements of said transmission mechanism, a conduit interconnecting said pressure source and said servo means including a shift valve mechanism, said shift valve mechanism having a movable valve element adapted to move from one position to another to interrupt distribution of fluid pressure to said servo means when it assumes said one position and establish such distribution when it assumes another position, throttle valve means for establishing a pressure signal which is related functionally in magnitude to engine torque, a passage interconnecting said throttle valve means and said shift valve mechanism for conducting said pressure signal to said shift valve mechanism to actuate the same, valve means responsive to said pressure signal for restricting communication between said throttle valve means and said shift valve mechanism and for increasing the degree of communication between said pressure source and said shift valve mechanism when said pressure signal exceeds a predetermined value, said throttle valve means including a pressure responsive valve actuator defining a vacuum pressure chamber communicating with said manifold, a movable valve element actuator rod extending within said chamber, a sealed collapsible bellows with subatmospheric pressure therein, one end of said bellows being connected to said rod and, another end thereof being anchored to a stationary portion of said actuator, changes in engine intake manifold pressure thereby resulting in a change in the volume of said bellows to initiate valve actuating movement of said rod.

2. In a control valve circuit for an automatic power transmission mechanism, said transmission mechanism being adapted to deliver driving torque to a driven member from an internal combustion engine having an air intake manifold, a fluid pressure operated servo, a fluid pressure source, conduit structure extending from said pressure source to said servo, a shift valve located in said conduit structure and adapted to control the distribution of fluid pressure to said servo, means for establishing a pressure signal which is functionally related in magnitude to an operating parameter, a pressure passage extending from said pressure signal establishing means to said shift valve whereby said shift valve is actuated in response to variations in the magnitude of said pressure signal, pressure signal responsive valve means disposed in part in said pressure passage for restricting the degree of communication between said shift valve and said pressure signal establishing means when said pressure signal exceeds a calibrated value, said pressure signal establishing means including a valve actuator partly defining a vacuum pressure chamber in communication with said air intake manifold, a sealed, evacuated, aneroid bellows disposed in said chamber, one end of said bellows being connected to a relatively stationary portion of said actuator, and a motion transmitting connection between a pressure modulating portion of said pressure signal establishing means and the other end of said bellows.

3. In a power transmission mechanism, torque delivery elements defining plural torque delivery paths between a driven member and an engine with an air intake manifold, each path being characterized by a separate torque ratio, fluid pressure operated control means for completing selectively said paths, a fluid pressure source, conduit structure interconnecting said source and said control means, first modulator valve means in fluid communication with said source and said control means for establishing a first pressure signal that is related functionally in magnitude to absolute engine manifold pressure, a regulator valve arrangement including regulator valve means for regulating the effective pressure made available by said source, additional modulator valve means communicating with said source and with said first modulator valve means for establishing a resultant pressure signal that is an indication of the demand for engine torque, and governor valve means for establishing a speed signal that is an indicator of the driven speed of said driven member, said resultant signal and said speed signal being applied to said control means to initiate automatic torque ratio changes, said regulator valve arrangement being subjected to said first signal and said speed signal to increase the regulated pressure level of said source when manifold pressure increases for any given driven speed and to decrease the regulated pressure level of said source when the driven speed of said driven member increases for any given manifold pressure, said first modulator valve means including a servo defining a pressure chamber, said pressure chamber communicating with the engine intake manifold, a sealed aneroid bellows disposed in said chamber, one end of said bellows being connected to a stationary portion of said servo, the other end of said bellows being connected operatively to a pressure modulating element of said first modulator valve means, variations in the magnitude of the engine intake manifold pressure thereby resulting in changes in the volume of said aneroid bellows to establish a force that acts upon said first modulator valve means.

4. In a power transmission mechanism, torque delivery elements defining plural torque delivery paths between a driven member and an engine with an air intake manifold, each path being characterized by a separate torque ratio, fluid pressure operated control means for completing selectively said paths, a fluid pressure source, conduit structure interconnecting said source and said control means, first modulator valve means in fluid communication with said source and said control means for establishing a first pressure signal that is related functionally in magnitude to absolute engine intake manifold pressure, a regulator valve arrangement including regulator valve means for regulating the effective pressure made available by said source, additional modulator valve means communicating with said source and with said first modulator valve means for establishing a resultant pressure signal that is an indication of the demand for engine torque, governor valve means for establishing a speed signal that is an indicator of the driven speed of said driven member, said resultant signal and said speed signal being applied to said control means to initiate automatic torque ratio changes, said regulator valve arrangement being subjected to said first signal and said speed signal to increase the regulated pressure level of said source when manifold pressure increases for any given driven speed and to decrease the regulated pressure level of said source when the driven speed of said driven member increases for any given manifold pressure, said first modulator valve means including a servo defining a pressure chamber, said pressure chamber communicating with the engine intake manifold, a sealed aneroid bellows disposed in said chamber, one end of said bellows being connected to a stationary portion of said servo, the other end of said bellows being connected operatively to a pressure modulating element of said first modulator valve means, variations in the magnitude of the engine intake manifold pressure thereby resulting in changes in the volume of said aneroid bellows to establish variations in the magnitude of said first pressure region, the connection between said valves and, said pressure modulating element comprising a valve actuating rod, a diaphragm seal surrounding said rod in sealing relationship, and means for securing the periphery of said diaphragm seal to a stationary portion of said servo whereby said rod may be moved with respect to said servo in a substantially frictionless fashion.

5. In a power transmission mechanism, torque delivery elements defining plural torque delivery paths between a driven member and an engine with an air intake manifold, each path being characterized by a separate torque ratio, fluid pressure operated control means for completing selectively said paths, a fluid pressure source, conduit structure interconnecting said source and said control means, modulator valve means in fluid communication with said source and said control means for establishing a pressure signal that is related functionally in magnitude to engine manifold pressure, governor means for establishing a speed signal that is an indicator of the driven speed for said driven member, means for subjecting said control means to said speed signal and said pressure signal, said modulator valve means comprising a servo mechanism defining a vacuum chamber, an evacuated aneroid bellows in said chamber, said chamber communicating with the engine intake manifold, one end of said bellows being connected to a relatively stationary portion of said servo, and a valve actuator rod connected to a movable portion of said modulator valve means, said rod being connected to the other end of said bellows.

6. In a power transmission mechanism, torque delivery elements defining plural torque delivery paths between a driven member and an engine air intake manifold, each path being characterized by a separate torque ratio, fluid pressure operated control means for completing selectively said paths, a fluid pressure source, conduit structure interconnecting said source and said control means, modulator valve means in fluid communication with said source and said control means for establishing a pressure signal that is related functionally in magnitude to engine manifold pressure, means for subjecting said control means to said pressure signal to initiate automatic torque ratio changes, said modulator valve means comprising a servo having a manifold pressure chamber, a fluid connection between said chamber and the engine intake manifold, collapsible aneroid bellows in said chamber, one end of said bellows being connected to a relatively stationary portion of said servo, and a valve operating rod extending from said servo and engageable with a movable portion of said modulator valve means, said rod being connected to the other end of said bellows.

7. In a power transmission mechanism, torque delivery elements defining plural torque delivery paths between a driven member and an engine with an air intake manifold, each path being characterized by a separate torque ratio, fluid pressure operated control means for completing selectively said paths, a fluid pressure source, conduit structure interconnecting said source and said control means, first modulator valve means in fluid communication with said source and said control means for establishing a pressure signal that is related functionally in magnitude to engine manifold pressure, additional modulator valve means communicating with said source and with said first modulator valve means for establishing a resultant signal that is an indicator of the demand for engine torque, and means for subjecting said control means to said resultant signal to initiate automatic torque ratio changes, said modulator valve means including a vacuum pressure operated servo defining a vacuum pressure chamber situated in fluid communication with the engine intake manifold, an air evacuated aneroid bellows in said chamber, one end of said bellows being connected to a relatively stationary portion of said servo, and a valve actuating element connected to a movable portion of said modulator valve means, the other end of said bellows being connected to said actuating element.

8. In a power transmission mechanism, torque delivery elements defining plural torque delivery paths between a driven member and an engine with an air intake manifold, each path being characterized by a separate torque ratio, fluid pressure operated control means for completing selectively said paths, a fluid pressure source, conduit structure interconnecting said source and said control means, first modulator valve means in fluid communication with said source and said control means for establishing a pressure signal that is related functionally in magnitude to engine manifold pressure, additional modulator valve means communicating with said source and with said first modulator valve means for establishing a resultant signal that is an indicator of the demand for engine torque, means for subjecting said control means to said resultant signal to initiate automatic torque ratio changes, said modulator valve means including a vacuum pressure operated servo defining a vacuum pressure chamber situated in fluid communication with the engine intake manifold, an air evacuated aneroid bellows in said chamber, one end of said bellows being connected to a relatively stationary portion of said servo, a valve actuating element connected to a movable portion of said modulator valve means, the other end of said bellows being connected to said actuating element, and a fluid seal between said element and a stationary portion of said servo comprising a flexible diaphragm surrounding said element in sealing relationship, and means for securing the margin of said diaphragm to said stationary portion of said servo, said diaphragm providing a substantially friction-free sealing connection between said element and said stationary portion.

References Cited by the Examiner

UNITED STATES PATENTS 3,077,122 2/1963 Olsen.
3,095,755 7/1963 Duffy.
3,106,104 10/1963 Harry.
3,159,051 12/1964 Herndon et al.

DAVID J. WILLIAMOWSKY, *Primary Examiner.*

DON A. WAITE, *Examiner.*

M. H. FREEMAN, J. R. BENEFIEL,
*Assistant Examiners.*